(12) United States Patent
Dale

(10) Patent No.: US 10,199,655 B2
(45) Date of Patent: *Feb. 5, 2019

(54) ELECTRODE STRUCTURE HAVING STRUCTURED CONDUCTIVE BUFFER LAYER

(71) Applicant: Nissan North America, Inc., Franklin, TN (US)

(72) Inventor: Nilesh Dale, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 284 days.

This patent is subject to a terminal disclaimer.

(21) Appl. No.: 14/954,510

(22) Filed: Nov. 30, 2015

(65) Prior Publication Data

US 2017/0155153 A1  Jun. 1, 2017

(51) Int. Cl.
| | | |
|---|---|---|
| *H01M 4/70* | (2006.01) | |
| *H01M 4/38* | (2006.01) | |
| *H01M 4/62* | (2006.01) | |
| *H01M 4/36* | (2006.01) | |
| *H01M 4/66* | (2006.01) | |
| *H01M 10/0525* | (2010.01) | |
| *H01M 4/02* | (2006.01) | |

(52) U.S. Cl.
CPC ............. *H01M 4/70* (2013.01); *H01M 4/366* (2013.01); *H01M 4/381* (2013.01); *H01M 4/382* (2013.01); *H01M 4/386* (2013.01); *H01M 4/387* (2013.01); *H01M 4/625* (2013.01); *H01M 4/626* (2013.01); *H01M 4/661* (2013.01); *H01M 4/663* (2013.01); *H01M 4/667* (2013.01); *H01M 10/0525* (2013.01); *H01M 2004/021* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 8,338,019 | B2 | 12/2012 | Lee et al. |
| 8,669,008 | B2 | 3/2014 | Cho et al. |
| 8,808,919 | B2 | 8/2014 | Kim |
| 8,870,978 | B2 | 10/2014 | Yun et al. |
| 8,974,966 | B2 | 3/2015 | Kim et al. |
| 9,005,819 | B2 | 4/2015 | Kwon et al. |
| 2007/0148550 | A1 | 6/2007 | Hasegawa et al. |
| 2011/0212359 | A1* | 9/2011 | Dai .................. H01M 10/0525 429/149 |
| 2013/0032278 | A1 | 2/2013 | Ottinger et al. |

(Continued)

FOREIGN PATENT DOCUMENTS

| | | |
|---|---|---|
| CN | 103779570 A | 5/2014 |
| JP | 2003297353 A | 10/2003 |

(Continued)

*Primary Examiner* — Wyatt P McConnell
(74) *Attorney, Agent, or Firm* — Young Basile Hanlon & MacFarlane, P.C.

(57) ABSTRACT

An electrode comprises a current collector, a conductive buffer layer formed on the current collector that has at least one geometrically configured region and an active material layer formed on the conductive buffer layer. The geometrically configured conductive buffer region can expand and contract between the non-lithiated and lithiated states.

17 Claims, 6 Drawing Sheets

(56) References Cited

U.S. PATENT DOCUMENTS

2013/0260237 A1    10/2013   Chang et al.
2013/0330617 A1    12/2013   Yoshimura et al.
2014/0255742 A1     9/2014   Kwon et al.

FOREIGN PATENT DOCUMENTS

JP       2005293960 A    10/2005
WO    2009141691 A2   11/2009
WO    2013021630 A1    2/2013

* cited by examiner

ELECTRODE STRUCTURE HAVING STRUCTURED CONDUCTIVE BUFFER LAYER

TECHNICAL FIELD

This disclosure relates to an electrode structure that reduces battery polarization and increases the energy and power density of the battery, and in particular, an electrode having a structured conductive layer between the active material and the current collector.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, materials such as silicon, tin sodium and their compounds has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

An electrode is disclosed that comprises a current collector, a conductive buffer layer formed on the current collector that has at least one geometrically configured region and an active material layer formed on the conductive buffer layer. The geometrically configured conductive buffer region can expand and contract between the non-lithiated and lithiated states.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Figure 1A:
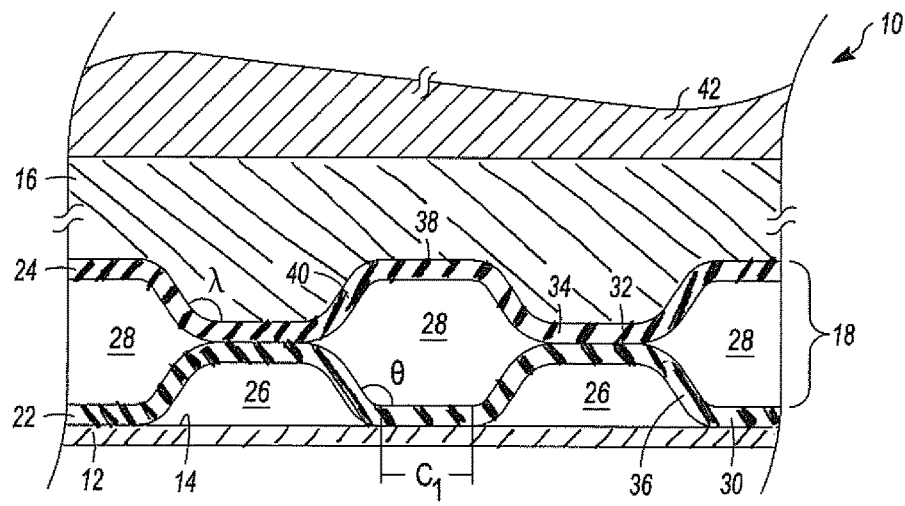
FIGS. 1A and 1B are cross-section views of a first embodiment of an electrode as disclosed having a geometrically structured conductive buffer layer.

Because the carbon material used in electrodes of conventional batteries, such as lithium ion batteries or sodium ion batteries, suffers from a low specific capacity, the conventional battery has poor energy density even though there is small polarization and good stability. To increase the energy density of batteries using carbon electrodes, alternative active materials with higher energy densities are required. Silicon, tin, germanium, cobalt oxide, manganese oxide and nickel oxide are non-limiting examples of materials that may be added to an electrode active material layer to improve its energy density, among other benefits.

One particular example is the use of silicon in lithium-ion batteries. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon can lead to electrode delamination, loss of porosity, electrical isolation of the active material, increase in electrode thickness, rapid capacity fade and ultimate cell failure.

Disclosed is a lithium ion battery and at least one associated electrode. The electrode includes a current collector, a conductive buffer layer formed on the current collector and an active material layer formed on the conductive buffer layer. The conductive buffer layer has at least one geometrically configured region. The conductive buffer layer can flex to expand and contract between non-lithiated and lithiated states while maintaining effective electroconductive contact between the active material layer and the current collector. The conductive buffer layer is interposed between the active material layer and the current collector. The conductive buffer layer has at least one geometrically configured region, typically a void space or a chamber, that is configured to reduce or eliminate delamination from the current collector, increase flexibility of the conductive buffer layer, and/or accommodate any swelling of energy density enhancing material present in the active material layer.

The active material layer can include electroactive materials as well as materials that increase energy density and capacity of the associated electrode. Non-limiting examples include charge bearing materials such as lithium, graphite, cobalt oxide, manganese oxide, nickel oxide and their compounds, such as lithium-transition metal composite oxides such as $LiMn_2O_4$, $LiCoO_2$, $LiNiO_2$, $Li(Ni-Co-Mn)O_2$, lithium-transition metal phosphate compounds, and lithium-transition metal sulfate compounds, etc. Non-limiting examples of energy density enhancing materials include silicon, tin, sodium and their compounds. For illustrative purposes, the active material layer comprises lithium, silicon, sulfur, and the like. The current collector can be a metal foil such as nickel, iron, copper, aluminum, stainless steel and carbon, as non-limiting examples, depending on the type of battery in which the electrode is used.

Figure 3:
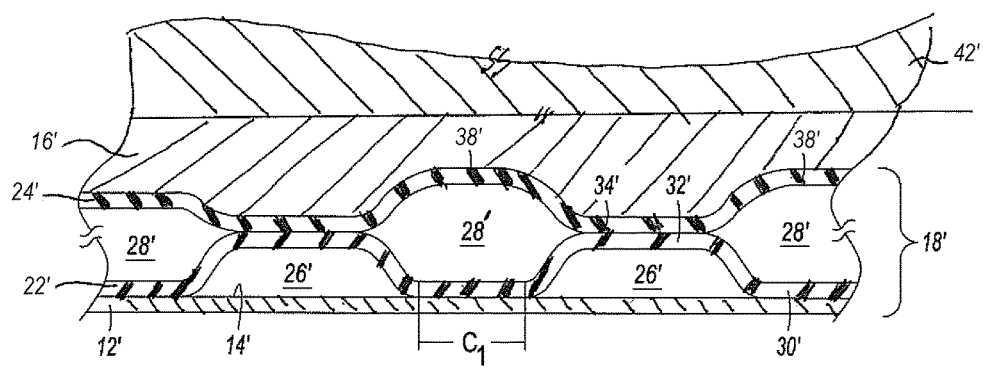
FIG. 3 is a cross sectional view of a second alternate view of the electrode of FIG. 1A.
Figure 4:
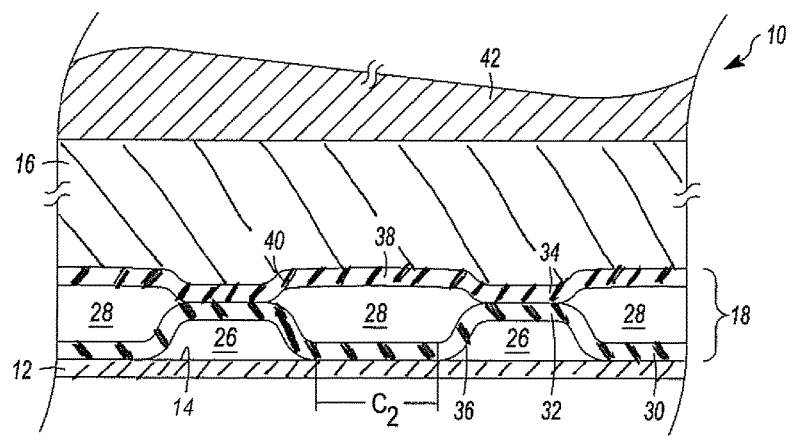
FIG. 4 is a cross sectional view of the electrode of 1A in a non-lithiated state.

A first embodiment of the electrode as disclosed is depicted in FIGS. 1-4. FIGS. 1A, 1B, 2 and 3 illustrate the electrode 10, 10' in which an energy density enhancing material or materials such as silicon are present in the conductive buffer layer in its non-lithiated state. Thus, components such as the conductive buffer layer 18 are present in their expanded state. FIG. 4 depicts the electrode 10 of FIG. 1A with the conductive buffer layer 18 compressed as would occur when the electrode 10, 10' is in the lithiated and energy density enhancing materials are in the expanded state.

Figure 1B:
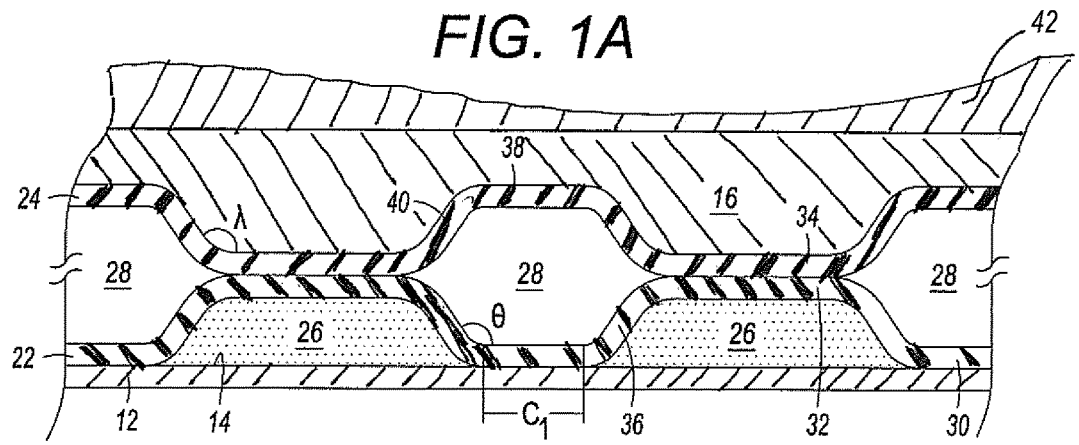
Figure 2:
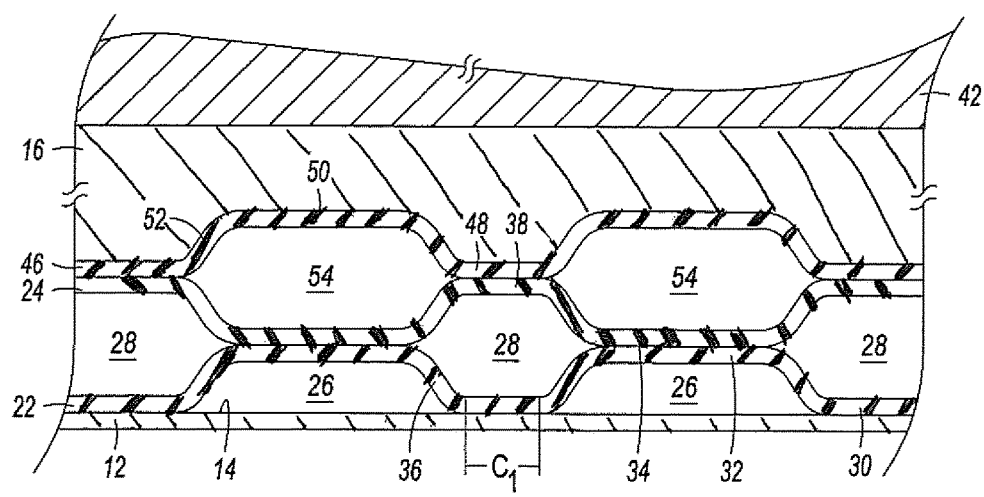
FIG. 2 is a cross-sectional view of a first alternate view of the electrode of FIG. 1A.

Though not to scale, the electrode 10 depicted in FIGS. 1A and 1B includes a current collector 12 having a surface 14 with an active material layer 16 deposited in overlying relationship to the surface 14 of the current collector 12. A conductive buffer layer 18 is interposed between the active material layer 16 and the current collector 12.

The conductive buffer layer 18 includes at least two sublayers 22, 24. The at least two sublayers 22, 24 are present in furrowed overlying relationship to the surface 14 of the current collector 12 and to one another and form a plurality of discrete chambers 26, 28 within the body of conductive buffer layer 18. "Furrowed relationship," as that term is used in this disclosure, includes various geometric contours. Non-limiting examples include longitudinal corrugation as well as discrete longitudinal chambers and mixtures of the two. One or more of the various sublayers 22, 24 can be configured as continuous elongated sheets and the discrete chambers are sealed against permeation by materials present in the active material layer.

The conductive buffer layer 18 has a thickness sufficient to accommodate the swelling of the energy density enhancing material particles present in the active material layer 16 that is supported on the conductive buffer layer 18, while maintaining the requisite electrode thickness. The conductive buffer layer 18 can be, for example, two microns in thickness or greater when in its expanded state. In certain applications, the thickness of the buffer layer can be between 2 and 10 microns.

Sublayer 22 has a plurality of discrete current collector contact regions 30 in direct contact with the surface 14 of the current collector 12 and a plurality of distal regions 32 located at spaced overlying distances from the surface 14 of the current collector 12. The elongated sheet that comprises the discrete current collector contact regions 30 and the distal regions 32 together with associated regions of the surface 14 of the current collector 12 define a plurality of discrete chambers 26 that have an expanded volume and a compressed volume.

The discrete current collector contact regions 30 collectively have a combined contact area sufficient to provide electrical conductive contact between the current collector 12 and the active material layer 16. Each individual discrete current collector region 30 has an individual contact area $C_1$ sufficient to provide suitable sustained contact between the conductive buffer layer 18 and the current collector 12.

Sublayer 22 can have any suitable cross sectional configuration. In the embodiment depicted in FIGS. 1A and 1B, the discrete current collector contacting regions 30 each have flat elongated regions that conform to the surface 14 of current collector 12. The discrete distal regions 32 of sublayer 22 can have any suitable cross sectional configuration. As depicted, the cross sectional configuration of the discrete distal regions 32 can be configured as flat elongate regions. However other cross sectional configurations are contemplated. Intermediate regions 36 extend between and are contiguously connected to respective discrete distal regions 32 and to the discrete current collector contact regions 30. The connection between each respective intermediate region 36 and each associated discrete distal region 32 define suitable interior connection angles θ generally greater than 90°.

Sublayer 24 has a plurality of discrete sublayer contact regions 34 that are in operative contact with of sublayer 22. In the embodiment defined in FIGS. 1A and 1B, the discrete sublayer regions 34 are in contact with sublayer 22 at or proximate to one or more of its discrete distal regions 32 to define a plurality of chambers 28 that have an expanded and contracted volume. As with sublayer 22, sublayer 24 can have any suitable cross sectional configuration. In the embodiment depicted in FIGS. 1A and 1B, the discrete sublayer regions 34 each have flat elongated regions that conform to the outwardly oriented surface of discrete distal regions 32 of sublayer 22, and can form a generally flat region that may be parallel to the surface 14 of the current collector 12.

Sublayer 24 also includes distal regions 38 that are located a spaced distance above sublayer 22. The sublayer 24 and associated distal regions 38 distal regions can have any suitable cross sectional configuration. As depicted, discrete distal regions 38 can be configured as flat elongate regions. Intermediate regions 40 extend between and are contiguously connected to respective discrete distal regions 38 and to sublayer regions 34. The connection between respective intermediate regions 40 and associated sublayer regions 34 each can define suitable interior connection angles λ; generally greater than 90°.

The at least two sublayers 22, 24 of the conductive buffer layer 18 can be composed of suitable flexible and conductive material. Non-limiting examples of such materials include least one of carbon, graphene, metals, metal alloys, carbon composites as well as mixtures of the foregoing. Carbon material can be present as one or more of graphene, graphite, carbon nanotubes, carbon black and the like. Non-limiting examples of carbon composites suitable for use include various tin carbon composites, tin-oxide carbon composites and the like. The composition in each of sublayers 22, 24 can also include suitable binders and additives. The material employed in each of the sublayers 22, 24 as configured will accommodate reversible flexure between an expanded shape and a compressed shape such as that depicted in FIG. 4 with the flexibility of the resulting buffer layer being greater than that of the associated separator 42. In the expanded state, the conductive buffer layer 18 will contact the current collector 12 with a first contact area value. In the compressed state, the conductive buffer layer 18 will have a second contact area value that is greater than the first contact area value.

The chambers 26 and 28 defined in the conductive buffer layer 18 can be void spaces that are generally sealed against permeation by components present in the active material layer. In certain configurations, the chambers 26 located proximate to the surface 14 of the current collector 12 can include suitable conductive material such as graphite or the like.

In certain embodiments, the conductive buffer layer 18 can include more than two sublayers. In the embodiment depicted in FIG. 3, the conductive buffer layer 18 is composed of three sublayers 22, 24 and 46. Sublayer 46 is an elongated sheet having any suitable cross sectional configuration composed of materials such as those previously enumerated. In the embodiment depicted in FIG. 3, sublayer 46 has a cross sectional configuration that repeats the configuration of sublayer 22 and defines a plurality of discrete contacting regions 48 that adhere or are connected to associated regions of sublayer 24 such as distal regions 38. Sublayer 46 also has a plurality of distal regions 50 and intermediate regions 52 that define a plurality of discrete chambers 54. It is understood that the configuration of the respective sublayers 22, 24, 46 can differ from one another provided that the associated conductive buffer layer 18 retains its flexibility and ability to compress and expand.

One non-limiting example of a conductive buffer layer 18' having at least two sublayers that are geometrically dissimilar to one another is depicted in FIG. 3. Electrode 10' comprises a current collector 12' having a surface 14', with an active material layer 16' deposited in overlying relationship to the surface current collector 12'. The conductive buffer layer 18 is interposed between the active material layer 16' and the current collector 12'. The conductive buffer layer 18' has at least one geometrically configured region.

The conductive buffer layer 18' includes sublayer 22' that has a plurality of discrete current collector contact regions 30' in direct contact with the surface 14' of the current collector 12' as well as a plurality of distal regions 32' located at spaced overlying distances from the surface 14' of the current collector 12' thereby defining discrete chambers 26'. The discrete current collector contact regions 32' collectively have a combined contact area sufficient to provide electrical conductive contact between the current collector 12' and the active material layer 16'. Each individual discrete current collector region 30' has an individual contact area sufficient to provide suitable sustained contact between the conductive buffer layer 18' and the current collector 12'.

Sublayer 24' is configured with repeating cross sectional undulations 38' that defines chambers 26' and 28' that provide a flexible irregular topography and accommodate flexure and compression during repeated lithiation and non-lithiation.

In the compressed state, the volumes of the various discrete chambers are reduced and the sublayers pressed closer to the surface of the current collector. In certain situations, the discrete current contactor regions exhibit increases individual contact area in the compressed state. The embodiment depicted in FIG. 1A is depicted in its compressed state in FIG. 4. In the compressed state as depicted in FIG. 4, sublayers 22 and 24 are positioned closer to the current collector 12 than in the non-compressed state. Similarly, the internal volume of one or more of the discrete chambers 26, 28 is reduced when in the compressed state. Compression results in an increase in contact area for one or more of the discrete current collector regions 30 over the contact area in the non-compressed state. As depicted in FIG. 4, contact area $C_2$ is greater than contact area $C_1$.

Figure 5:
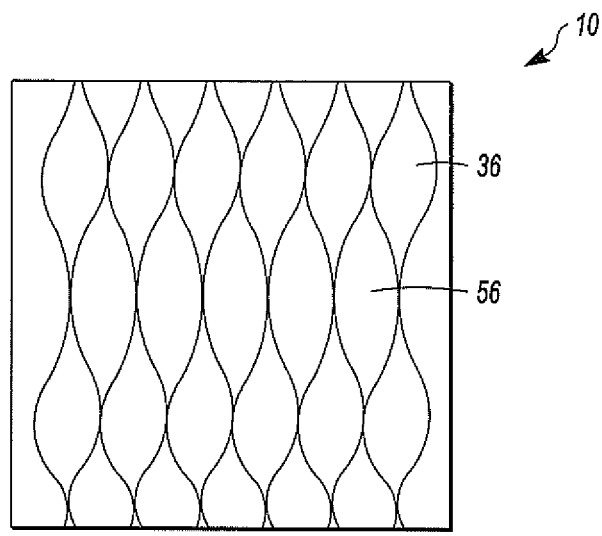
FIG. 5 is a top plan view of the one representative topography of the embodiment of the conductive buffer layer of FIG. 1 A.
Figure 6:
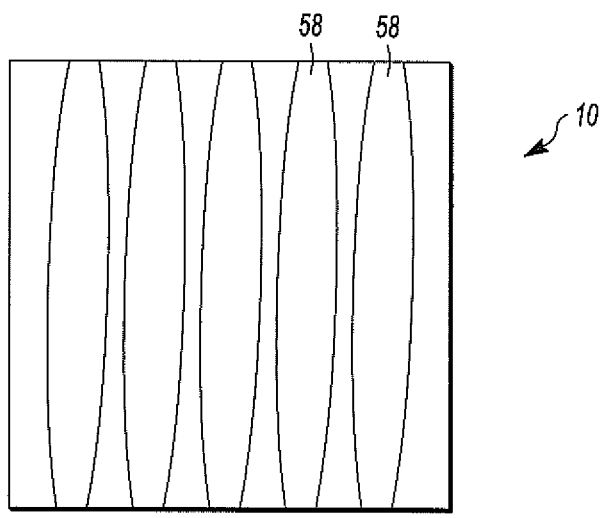
FIG. 6 is a top plan view an alternate topography of the embodiment of the conductive buffer layer of FIG. 1.

The various chambers defined in the electrode 10 have any suitable configuration that facilitates compression and expansion of the conductive buffer layer buffer 18 as the associated battery cycles between the lithiated and non-lithiated states. Non-limiting examples of chamber configuration include discrete compartments 56 as depicted in FIG. 5 and continuous channels 58 as depicted in FIG. 6. It is also understood that the shape of various compartments various compartments can vary within the conductive buffer layer 18 of a given electrode 10.

Figure 7:
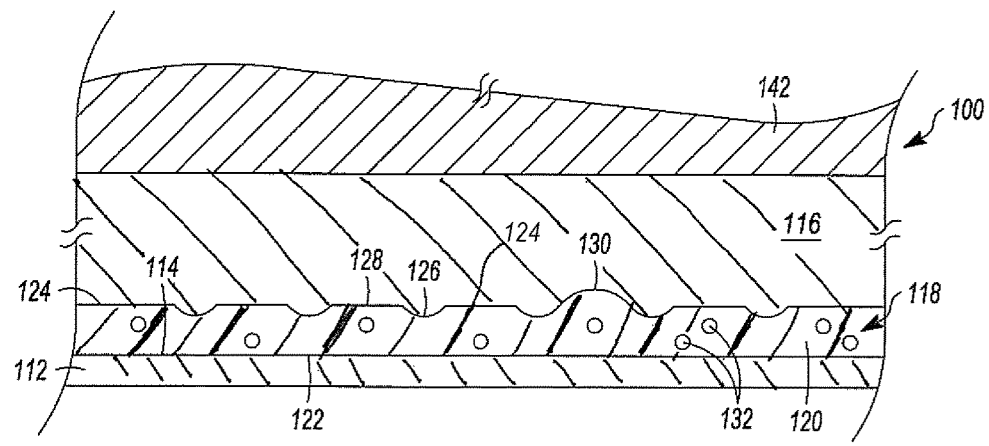
FIG. 7 is a cross sectional view of second embodiment of an electrode as disclosed having a geometrically structured conductive buffer layer.

A second embodiment of the electrode as disclosed is depicted in FIGS. 7-13. FIGS. 7-12 depict various configurations of electrode 100. As illustrated in FIG. 7, the electrode 100 includes a current collector 112 having a surface 114, a conductive buffer layer 118 that is formed on the surface 114 of the current collector 112, an active material layer 116 formed on the conductive buffer layer 118 and a separator 142. The separator 142 can have a flexibility that is less than the flexibility of the conductive buffer layer The conductive buffer layer 118 has a current collector overlying layer 120 composed of a conductive polymer. The current collector overlying layer 120 has a first face 122 in overlying contact with the surface 114 of the current collector 112, and a second face 124 opposed to the first face 122. The second face 124 of the current collector overlying layer 120 has at least one topographic feature defined therein. The topographical feature can be any suitable indentations 126, bumps 130 and/or ridges 128 defined in surface 124. Other topographical features that can be incorporated in the conductive buffer layer include elements such as troughs, protrusions and the like. The conductive buffer layer 118 can be configured with a combination of the features with featured present on the first face 124 present in any suitable random irregular or repeating pattern. The surface features can be configured to enhance flexibility of the material between an expanded and compressed state. The conductive buffer layer 118 can also include pores 132 of uniform or varying diameters and dimensions defined in the body of the conductive buffer layer 118. The degree of imparted porosity will be that sufficient to provide compressibility to the conductive buffer layer 118.

The conductive buffer layer 118 is composed of a conductive polymer having suitable compressive and expansive characteristics. Without being bound to any theory, it is believed that the conductive polymer employed when configured into a layer having one or more of the topographical features enumerated will compress as energy density enhancing compounds present in the active material layers expand upon lithiation, and can expand as lithiation is reversed.

The conductive polymeric compound can be a suitable metal rubber. As used herein, the term "metal rubber" is defined as polymeric material with metal ions present in sufficient amount to make the material electroconductive, typically prepared by methods such as electrostatic assembly. One non-limiting example of material and method are set forth in US Application Number 2008/199685 to Botner, the specification of which is incorporated by reference herein.

The conductive buffer layer 118 has a thickness sufficient to accommodate the swelling of the particles in the active material layer that the buffer layer supports while maintaining a requisite electrode thickness. The conductive buffer layer 118 can have a thickness of at least 2 microns with thickness when in its expanded state, with thickness between 2 and 10 microns contemplated in certain applications.

The active material layer 112 can be composed of a suitable conductive material as has been outlined previously. Non-limiting examples of such materials include of silicon, tin, lithium, sodium and their compounds.

Figure 8:
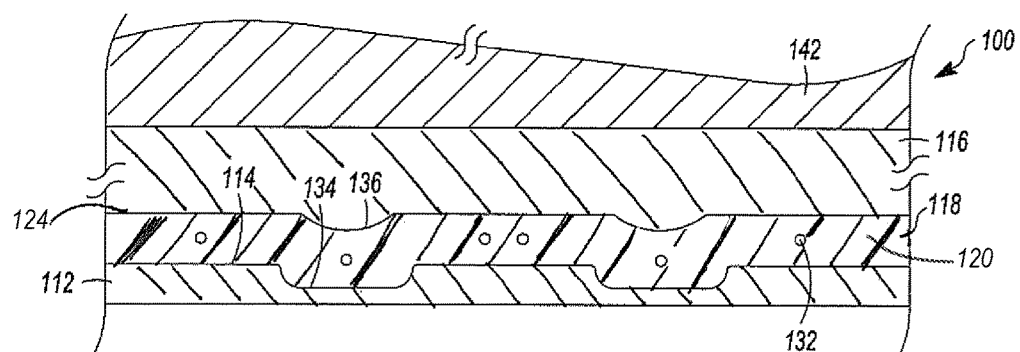
FIG. 8 is a cross sectional view of a first alternate configuration of the electrode of FIG. 7.

In certain configurations, the current collector over lying layer 120 can conform to at least one topographic feature 134 defined in the surface 114 of the current collector such as those depicted in FIG. 8. In FIG. 8, the surface 114 includes indentations extending from the surface into the interior of the body of the current collector 112. These can be ridges, troughs, dimples, etc. In the configuration in FIG. 8 topographic features 136 in the second face 124 are the result of conformance with topographic features present in the surface 114 in the current collector 112. The current collector overlying layer 120 can configured with internal pores 132 if desired or required.

Figure 9:
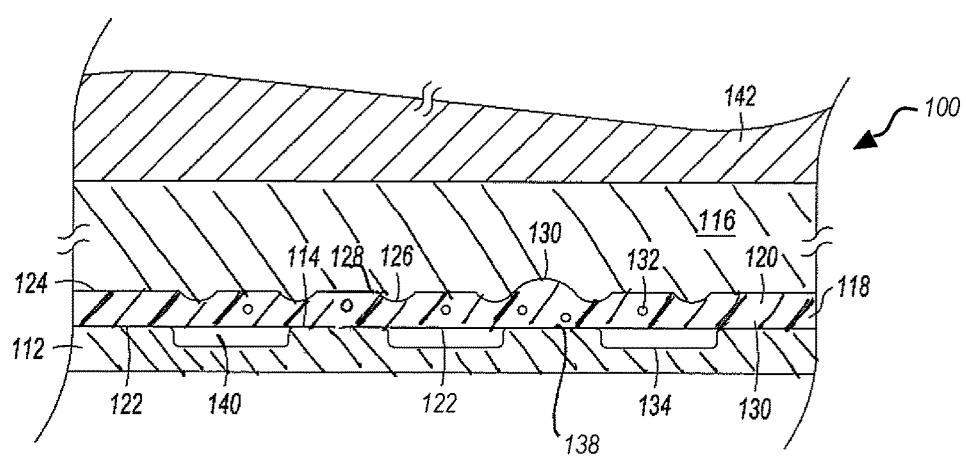
FIG. 9 is a cross sectional view of a second alternate configuration of the electrode of FIG. 7.
Figure 10:
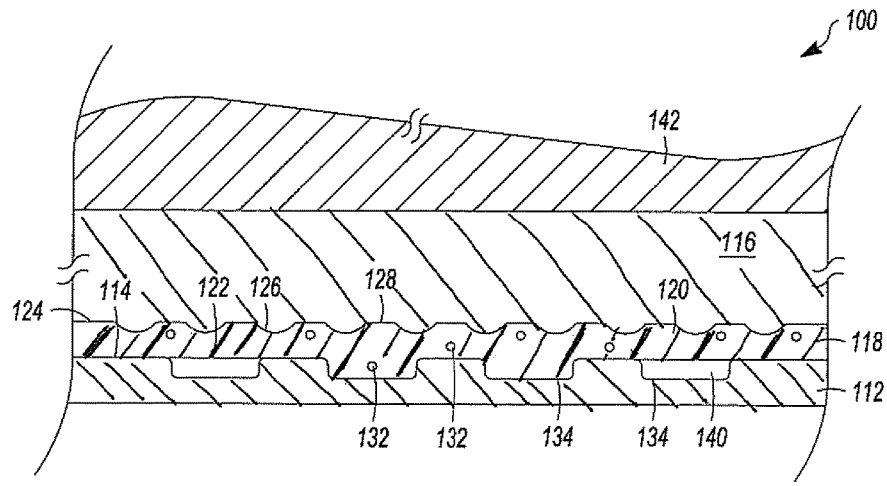
FIG. 10 is a cross sectional view of a third alternate configuration of the electrode of FIG. 7.

The electrode 100 can be configured with a current collector overlying layer 120 in direct contact only with defined regions 138 of the surface 114 of the current collector 112. One example such an electrode is illustrated in FIG. 9. The surface 114 of the current collector 112 can be configured with topographical features 134 such as indentations or channels. In the configuration illustrated in FIG. 9, the first face 122 of the current collector overlying layer 120 of the buffer layer 118 is in direct contact with the defined regions 134 of the current collector. In the non-compressed condition, the overlying layer 120 extends over the indentations to define one or more discrete spaced chambers 140 forming void spaces. Typically, this would occur when the buffer layer 118 is in the expanded condition as when the electrode 100 is in the non-lithiated state. When the active material layer 116 is lithiated, the energy density enhancing materials present expand. Expansion compresses the current collector overlying layer 120 into the spaced chambers 140 thereby increasing contact area between the surface 114 of current collector 112 and the surface 122 of current collector overlying layer 120. The opposed surface 124 of the current collector overlying layer 120 may be generally planar or can be configured with suitable indentations 126, bumps 130 and/or ridges 128 as desired or required. Thus, the current collector overlying layer 120 flexes between an expanded shape and a compressed shape such that the contact area between the current collector overlying layer in the expanded and the current collector in non-lithiated state is less than the contact area when the buffer layer is compressed when the electrode is in the lithiated state.

Electrode 100 can be configured with a current collector overlying layer 120 that conforms or extends into a portion of topographic features defined in the face 114 of the associated current collector 112. In the configuration illustrated in FIG. 10, the current collector contacting layer 120 of the buffer layer 118 extends into a portion of indentations 134 defined in the surface 114 of the current collector 112 and extends over another portion of the indentations 134 to define chambers or voids 140. Where desired or required, the second face 124 of the current collector overlying layer 120 can be configured with one or suitable topographical features such as those that have been discussed previously.

Figure 11:
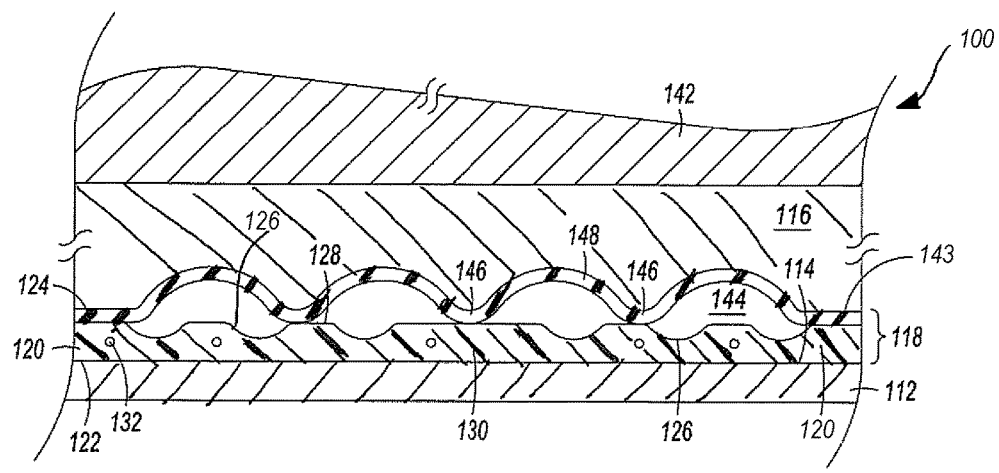
FIG. 11 is a cross sectional view of a fourth alternate configuration of the electrode of FIG. 7.
Figure 12:
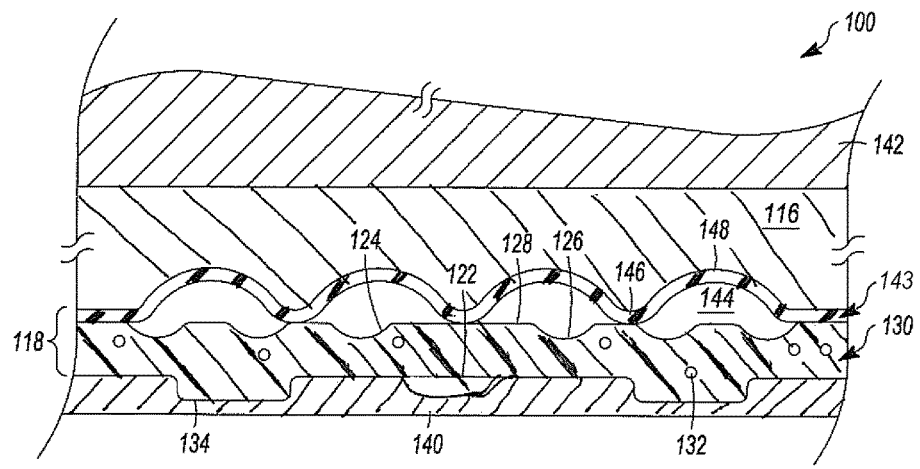
FIG. 12 is a cross sectional view of a fifth alternate configuration of the electrode of FIG. 7.
Figure 13:
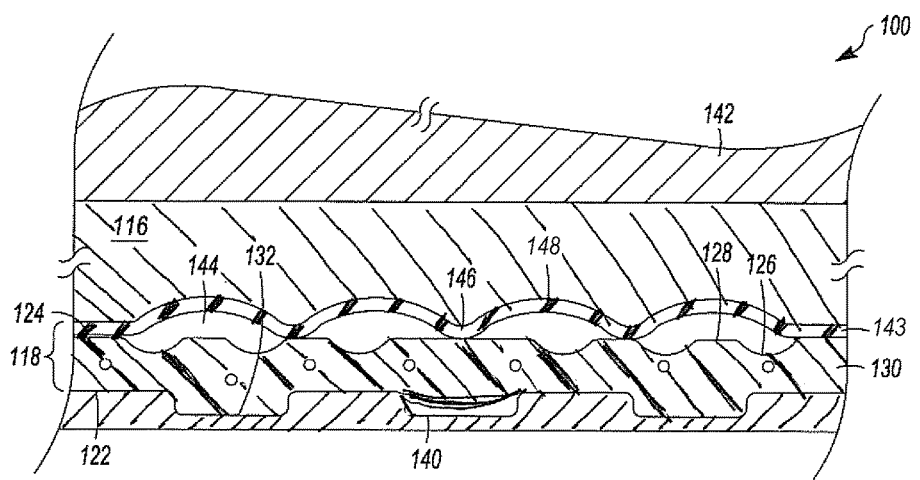
FIG. 13 is a cross-sectional view of the electrode of FIG. 7 in a non-lithiated state.

In certain applications, the conductive buffer layer 118 of electrode 100 can include multiple layers. FIGS. 11 and 12 illustrate non-limiting examples of conductive buffer layer configurations having at least two layers. Electrode 110 includes a current collector 112 that has surface 114, a conductive buffer layer 118 formed on the surface 114 current collector 112 and an active material layer 116 formed on conductive buffer layer 118. Conductive buffer layer 118 includes a current collector overlying layer 120 composed of a conductive polymer. The current collector overlying layer 120 has a first face 122 that is in overlying contact with the surface 114 of the current collector 112, and a second face 124 opposed to the first face 122. The conductive buffer layer 118 also includes at least one outer layer 143 in overlying relationship to the current collector overlying layer 120.

Current collector overlying layer 120 can have any of the configurations and elements discussed previously. As illustrated in FIG. 11, the current collector has a flat surface 114 with the current collector overlying layer 120 in generally planar contacting relationship such that the first face 122 is in conforming contact with the surface 114 of the current collector over essentially its entire area. In FIG. 12, the current collector overlying layer 120 can also include conformal regions 136 and/or discrete chambers 140.

The current collector overlying layer 120 can be composed of metal rubber material such as that described previously and may or may not possess internally defined pores such as pores 132. The second face 122 can include topographical features such as those described previously. These topographical features can be one or more of ridges, indentations, troughs, protrusions, bumps, etc. In the configuration depicted in FIG. 11, the second face 122 includes a series of ridges 126.

The buffer layer 118 in FIGS. 11 and 12 also includes at least one outer layer 143 in overlying connect relationship with the second face 124 of the current collector overlying layer 120. The outer layer 143 can be present in furrowed overlying relationship to the current collector overlying layer 120 to define a plurality of discrete chambers 144 within the body of conductive buffer layer 118. Non-limiting examples include longitudinal corrugations as well as discrete longitudinal chambers, and mixtures of the two. The outer layer 143 can be configured as a continuous elongated sheet of material. The outer layer 143 can be composed of a suitable electroconductive material such as metal rubber, carbon, graphene, metals, metal alloys, carbon composites as well as mixtures of the foregoing. The outer layer 143 also includes a plurality of discrete current collector overlying layer contacting regions 146 and associated distal regions 148.

The outer layer 143 of the conductive buffer layer flexes between an expanded shape when the active material layer is non-lithiated to a compressed shape when the energy density enhancing material in the active material layer is in its expanded state upon lithiation. The discrete current collector overlying layer contacting regions 146 each have a first contact area value when the outer layer is in the expanded shape and a second contact area value when the outer layer is in the compressed shape such that the first contact area value is less that the second contact area value.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrode comprising:
a current collector having a surface;
a conductive buffer layer formed on the current collector, the conductive buffer layer having at least two sublayers in furrowed overlying relationship to the current collector and to each other, the at least two sublayers forming a plurality of discrete chambers in the conductive buffer layer; and
an active material layer formed on the conductive buffer layer opposite the current collector.

2. The electrode of claim 1, wherein at least one first sublayer of the conductive buffer layer is a continuous elongated sheet having a plurality of discrete current collector contact regions in direct contact with the surface of the current collector and a plurality of distal regions located at spaced overlying distances from the surface of the current collector, and wherein at least one second sublayer is a continuous elongated sheet having a plurality of discrete sublayer contact regions such that discrete regions of the at least one second sublayer are in direct contact with respective distal regions of the at least one first sublayer.

3. The electrode of claim 1, wherein at least one sublayer is an elongated sheet connected to the surface of the current collector and form a plurality of discrete chambers therebetween, and wherein the at least two sublayers form a plurality of discrete chambers therebetween.

4. The electrode of claim 1, wherein the buffer layer is composed of at least one of carbon, graphene, metals, metal alloys, carbon composites.

5. The electrode of claim 1, wherein the at least two sublayers are independently composed of at least one of carbon, graphene, metal, metal alloys, carbon composites.

6. The electrode of claim 1, wherein at least a portion of the chambers contain one or more materials selected from the group consisting of silicon, tin, lithium, sodium and their compounds.

7. The electrode of claim 1 wherein the current collector one or more materials selected from the group consisting of nickel, stainless steel, copper, aluminum and carbon.

8. The electrode of claim 1, wherein the buffer layer is at least two microns in thickness.

9. The electrode of claim 1, wherein the active material layer comprises one or more materials selected from the group consisting of silicon, tin, lithium, sodium germanium, cobalt, manganese, nickel and their compounds, and wherein the at least two sublayers of the buffer layer flex between an expanded shape and a compressed shape.

10. The electrode of claim 9, wherein the buffer layer has a first contact area value with the current collector when the at least two sublayers are in the expanded shape and a second contact area value when the at least two sublayers are in the compressed shape, and wherein the first contact area value is less that the second contact area value.

11. The electrode of claim 9, wherein the at least two sublayers in the buffer layer compress when energy density enhancing materials present in the active material layer expand in volume, wherein the energy density enhancing material includes at least one of the following; silicon, tin, germanium, cobalt, manganese, nickel and their compounds.

12. A lithium ion battery comprising the electrode of claim 1, wherein the electrode is an anode, the active material layer comprises at least one of silicon, tin, lithium, sodium and their compounds, wherein at least one first sublayer of the conductive buffer layer is a continuous elongated sheet having a plurality of discrete current collector contact regions in direct contact with the surface of the current collector and a plurality of distal regions located at spaced overlying distances from the surface of the current collector, and wherein at least one second sublayer is a continuous elongated sheet having a plurality of discrete sublayer contact regions in direct contact with respective distal regions of the at least one first sublayer.

13. The lithium ion battery of claim 12, further comprising:
a separator in operative contact to the active material, wherein the separator has a separator flexibility value and the buffer layer has a buffer layer flexibility value, the buffer layer flexibility value greater than the separator flexibility value.

14. The lithium ion battery of claim 13, wherein the first sublayer and the surface of the current collector form a plurality of discrete flexible chambers, and wherein the first and second sublayers form a plurality of discrete flexible chambers.

15. The lithium ion battery of claim 13, wherein silicon, tin, lithium, sodium and their compounds are present in the active layer at a concentration that varies in response to battery function, and wherein the at least two sublayers in the buffer layer compress when the concentration of silicon or tin in the active material layer is increased.

16. The lithium ion battery of claim 13, wherein the at least two sublayers of the buffer layer flex between an expanded shape and a compressed shape.

17. The lithium ion battery of claim 16, wherein the buffer layer has a first contact area value with the current collector when the at least two sublayers are in the expanded shape and a second contact area value when the at least two sublayers are in the compressed shape, and wherein the first contact area value is less that the second contact area value.

* * * * *